United States Patent
Kim et al.

(10) Patent No.: US 10,832,140 B2
(45) Date of Patent: Nov. 10, 2020

(54) METHOD AND DEVICE FOR PROVIDING INFORMATION FOR EVALUATING DRIVING HABITS OF DRIVER BY DETECTING DRIVING SCENARIOS OCCURRING DURING DRIVING

(71) Applicant: StradVision, Inc., Gyeongsangbuk-do (KR)

(72) Inventors: Kye-Hyeon Kim, Seoul (KR); Yongjoong Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Dongsoo Shin, Gyeonggi-do (KR); Donghun Yeo, Gyeongsangbuk-do (KR); Wooju Ryu, Gyeongsangbuk-do (KR); Myeong-Chun Lee, Gyeongsangbuk-do (KR); Hyungsoo Lee, Seoul (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days.

(21) Appl. No.: 16/724,747

(22) Filed: Dec. 23, 2019

(65) Prior Publication Data
US 2020/0242477 A1    Jul. 30, 2020

Related U.S. Application Data

(60) Provisional application No. 62/798,618, filed on Jan. 30, 2019.

(51) Int. Cl.
*G06N 3/08* (2006.01)
*G06N 3/04* (2006.01)
(Continued)

(52) U.S. Cl.
CPC ........... *G06N 3/084* (2013.01); *G06N 3/0445* (2013.01); *G06N 3/0454* (2013.01); *G06N 3/088* (2013.01); *G08G 1/0133* (2013.01); *H04W 4/40* (2018.02)

(58) Field of Classification Search
CPC ....... H04W 4/40; G08G 1/0133; G06N 3/084; G06N 3/0445; G06N 3/0454; G06N 3/088
See application file for complete search history.

(56) References Cited

U.S. PATENT DOCUMENTS

| 9,645,577 B1 * | 5/2017 | Frazzoli | .......... B60W 30/18163 |
| 2017/0096164 A1 * | 4/2017 | Sun | .......... B62D 6/002 |

(Continued)

FOREIGN PATENT DOCUMENTS

CN        107697070 A       9/2017

OTHER PUBLICATIONS

Gupta et al., "Social GAN: Socially Acceptable Trajectories with Generative Adversarial Networks," in Proc. IEEE Conf. Computer Vision and Pattern Recognition 2255-64 (2018). (Year: 2018).*

(Continued)

*Primary Examiner* — Kamran Afshar
*Assistant Examiner* — Ryan C Vaughn
(74) *Attorney, Agent, or Firm* — Husch Blackwell LLP

(57) ABSTRACT

A learning method for detecting driving events occurring during driving, to thereby detect driving scenarios including at least part of the driving events is provided. The method includes: (a) in response to a specific enumerated event vector including each of pieces of information on each of specific driving events as its specific components in a specific order being acquired, a learning device instructing (Continued)

a recurrent neural network (RNN) to apply RNN operations to the specific components of the specific enumerated event vector, to thereby detect a specific predicted driving scenario including the specific driving events; (b) the learning device instructing a loss module to generate an RNN loss by referring to the specific predicted driving scenario and a specific ground-truth (GT) driving scenario and to perform a backpropagation through time (BPTT) by using the RNN loss, to thereby learn at least part of the parameters of the RNN.

14 Claims, 4 Drawing Sheets

(51) Int. Cl.
  *H04W 4/40* (2018.01)
  *G08G 1/01* (2006.01)

(56) References Cited

U.S. PATENT DOCUMENTS

| | | | | |
|---|---|---|---|---|
| 2017/0305434 | A1* | 10/2017 | Ratnasingam | G05D 1/0088 |
| 2018/0053108 | A1 | 2/2018 | Olabiyi et al. | |
| 2018/0174446 | A1* | 6/2018 | Wang | G08G 1/0112 |
| 2019/0051153 | A1* | 2/2019 | Giurgiu | G01C 21/3691 |
| 2019/0317455 | A1* | 10/2019 | Leon | G05B 13/04 |
| 2020/0074653 | A1* | 3/2020 | Duan | G06T 7/536 |

OTHER PUBLICATIONS

Arnelid, "Sensor Modeling with Recurrent Conditional GANs," master's thesis, Chalmers U. Tech. (2018). (Year: 2018).*

* cited by examiner

METHOD AND DEVICE FOR PROVIDING INFORMATION FOR EVALUATING DRIVING HABITS OF DRIVER BY DETECTING DRIVING SCENARIOS OCCURRING DURING DRIVING

CROSS REFERENCE OF RELATED APPLICATION

This application claims the benefit of priority to U.S. Provisional Patent Application No. 62/798,618, filed Jan. 30, 2019, the entire contents of which are incorporated herein by reference.

FIELD OF THE DISCLOSURE

The present disclosure relates to a method and a device for use with an autonomous vehicle; and more particularly, to a method and a device for providing information for evaluating driving habits of a driver by detecting driving scenarios occurring during driving.

BACKGROUND OF THE DISCLOSURE

It is very important for a vehicle to be driven safely as it has a large mass and a high speed, and thus a high kinetic energy. However, it is true that most drivers are driving dangerously for their own convenience. In addition, the drivers do not have any standards or criteria by which to judge whether their own driving habits are dangerous or illegal, and thus it is difficult to correct driving habits.

SUMMARY OF THE DISCLOSURE

It is an object of the present disclosure to solve all the aforementioned problems.

It is another object of the present disclosure to provide a method for detecting driving scenarios during driving.

It is still another object of the present disclosure to provide a method for evaluating driving habits of a driver by using the detected driving scenarios.

It is still yet another object of the present disclosure to provide a method for evaluating driving habits, to thereby support a driver to analyze the driving habits and improve driving habits.

In accordance with one aspect of present disclosure, there is provided a learning method for detecting driving events occurring during driving, to thereby detect driving scenarios including at least part of the driving events, including steps of: (a) a learning device, in response to at least one specific enumerated event vector, including each of a plurality of pieces of information on each of specific driving events as its specific components in a specific order, being acquired, instructing a Recurrent Neural Network (RNN) to apply one or more RNN operations to the specific components, of the specific enumerated event vector, in the specific order, to thereby detect at least one specific predicted driving scenario including at least part of the specific driving events; (b) the learning device instructing a loss module to generate an RNN loss by referring to the specific predicted driving scenario and a specific ground-truth (GT) driving scenario, which has been acquired beforehand, and to perform a backpropagation through time (BPTT) by using the RNN loss, to thereby learn at least part of the parameters of the RNN.

As one example, before the step of (a), the method further includes a step of: (a0) the learning device, which interworks with a driving scenario generating device, acquiring the specific enumerated event vector and the specific GT driving scenario by performing processes of (i) the driving scenario generating device providing each of a plurality of graphical objects corresponding to each of a plurality of driving events including the specific driving events through a display device, (ii) the driving scenario generating device, if specific graphical objects corresponding to the specific driving events are selected by a user in the specific order, generating the specific enumerated event vector by using said each of a plurality of pieces of the information on said each of the selected specific driving events in the specific order, (iii) the driving scenario generating device generating the specific GT driving scenario corresponding to the specific driving events in the specific order, and (iv) the driving scenario generating device delivering the specific enumerated event vector and the specific GT driving scenario to the learning device.

As one example, the driving scenario generating device, if the specific driving events are selected among the driving events, applies at least one modulation operation to at least one of the specific driving events, and further generates at least one modulated specific enumerated event vector and at least one modulated specific GT driving scenario by using the specific driving events to which the modulation operation has been applied.

As one example, before the step of (a), the method further includes a step of: (a1) the learning device, which interworks with a driving scenario generating device, acquiring the specific enumerated event vector and the specific GT driving scenario by performing processes of (i) the driving scenario generating device instructing a generative adversarial network (GAN) to perform at least one GAN operation to thereby (i-1) select the specific driving events, among the driving events, in the specific order, (i-2) generate the specific enumerated event vector by using said each of a plurality of pieces of the information on said each of the specific driving events in the specific order and (i-3) generate the specific GT driving scenario corresponding to the specific driving events in the specific order, and (ii) the driving scenario generating device delivering the specific enumerated event vector and the specific GT driving scenario to the learning device.

As one example, the driving scenario generating device has instructed a generating network included in the GAN, which had been trained beforehand, to perform at least one generating operation, which is at least part of the GAN operation, to thereby select the specific driving events in the specific order to generate the specific enumerated event vector.

As one example, the GAN (i) had instructed the generating network to generate each of first enumerated event vectors for training corresponding to each of a plurality of first groups of first driving events for training in each of first orders for training, (ii) had instructed a discriminating network to generate a predicted discrimination score representing a probability of at least one of its inputted event vector, which is at least one of the first enumerated event vectors for training and second enumerated event vectors for training generated by a manager, having been generated by the manager or the generating network, (iii) had generated a GAN loss by referring to the predicted discrimination score and a GT discrimination score, and (iv) had performed a backpropagation by using the GAN loss, to thereby learn at least part of the parameters included in the discriminating network and the generating network.

As one example, before the step of (a), the method further includes a step of: (a3) the learning device, which interworks with a driving scenario generating device, acquiring the specific enumerated event vector and the specific GT driving scenario through the driving scenario generating device, on the condition that the specific enumerated event vector and the specific GT driving scenario satisfy a prescribed verification rule.

As one example, the verification rule, corresponding to one or more specific road rules which have been violated by drivers for a prescribed number of times during a specific time range of the past, is inputted to the driving scenario generating device by a manager, and the driving scenario generating device determines that the specific enumerated event vector and the specific GT driving scenario satisfy the verification rule when one or more circumstances of complying with or violating the specific road rules are reflected on the specific enumerated event vector and the specific GT driving scenario, by referring to the verification rule.

As one example, the learning device instructs the RNN to perform the RNN operation by using a technique selected among (i) a technique of long short-term memory (LSTM) and (ii) a technique of gated recurrent unit (GRU).

In accordance with another aspect of the present disclosure, there is provided a testing method for detecting driving scenarios occurring during driving, to thereby evaluate driving habits of a subject driver, including steps of: (a) (1) a learning device, in response to at least one specific enumerated event vectors for training, including each of pieces of information on each of specific driving events for training as its specific components for training in a specific order for training, being acquired, instructing a recurrent neural network (RNN) to apply one or more RNN operations to the specific components for training, of the specific enumerated event vector for training, in the specific order for training, to thereby detect at least one specific predicted driving scenario for training including at least part of the specific driving events for training; and (2) the learning device instructing a loss module to generate an RNN loss by referring to the specific predicted driving scenario for training and a specific ground-truth (GT) driving scenario, which has been acquired beforehand, and to perform a backpropagation through time (BPTT) by using the RNN loss, to thereby learn at least part of the parameters of the RNN, a testing device, which interworks with a subject vehicle, if one or more driving events for testing are detected, instructing the RNN to apply the RNN operations to each of pieces of information on each of the driving events for testing, to thereby detect one or more predicted driving scenarios for testing including at least part of the driving events for testing in sequence; (b) the testing device instructing an evaluation module to generate evaluation information to be used for evaluating driving habits of the subject driver of the subject vehicle, by referring to the predicted driving scenario for testing.

As one example, at the step of (a), the testing device instructs an event detection module to detect the driving events for testing occurring inside and outside the subject vehicle during a driving by interworking with at least one of an electrical control unit (ECU) and an exterior circumstance monitoring unit installed to the subject vehicle.

As one example, the testing device instructs the event detection module to acquire at least part of interior operation information, including at least part of direction information, velocity information, turn signal information and emergency signal information by interworking with the ECU, to thereby detect at least part of the driving events for testing.

As one example, the testing device instructs the event detection module to acquire at least part of exterior circumstance information, including at least part of indicating information of a traffic sign located closer than a first threshold from the subject vehicle, surrounding motion information of surrounding vehicles located closer than a second threshold from the subject vehicle and lane information in a lane including the subject vehicle by interworking with at least one of an external camera and a V2X communication module of the exterior circumstance monitoring unit, to thereby detect at least part of the specific driving events.

As one example, at the step of (b), the testing device instructs the evaluation module to perform a statistical analysis operation on at least one of the number and a frequency of the subject driver violating road rules, which are acquired by referring to the predicted driving scenario for testing, and to generate the evaluation information including a result of the statistical analysis operation.

In accordance with still another aspect of the present disclosure, there is provided a learning device for detecting driving events occurring during driving, to thereby detect driving scenarios including at least part of the driving events, including: at least one memory that stores instructions; and at least one processor configured to execute the instructions to perform processes of: (I) if at least one specific enumerated event vector, including each of pieces of information on each of specific driving events as its specific components in a specific order, is acquired, instructing a recurrent neural network (RNN) to apply one or more RNN operations to the specific components, of the specific enumerated event vector, in the specific order, to thereby detect at least one specific predicted driving scenario including at least part of the specific driving events; (II) instructing a loss module to generate an RNN loss by referring to the specific predicted driving scenario and a specific ground-truth (GT) driving scenario, which has been acquired beforehand, and to perform a backpropagation through time (BPTT) by using the RNN loss, to thereby learn at least part of the parameters of the RNN.

As one example, before the process of (I), the processor further performs a process of: (I1) acquiring the specific enumerated event vector and the specific GT driving scenario by performing processes of (i) the driving scenario generating device providing each of a plurality of graphical objects corresponding to each of driving events including the specific driving events through a display device, (ii) the driving scenario generating device, if specific graphical objects corresponding to the specific driving events are selected by a user in the specific order, generating the specific enumerated event vector by using said each of a plurality of pieces of the information on said each of the selected specific driving events in the specific order, (iii) the driving scenario generating device generating the specific GT driving scenario corresponding to the specific driving events in the specific order, and (iv) the driving scenario generating device delivering the specific enumerated event vector and the specific GT driving scenario to the learning device.

As one example, the driving scenario generating device, if the specific driving events are selected among the driving events, applies at least one modulation operation to at least one of the specific driving events, and further generates at least one modulated specific enumerated event vector and at least one modulated specific GT driving scenario by using the specific driving events to which the modulation operation has been applied.

As one example, before the process of (I), the processor further performs a process of: (I2) acquiring the specific enumerated event vector and the specific GT driving scenario by performing processes of (i) a driving scenario generating device, which interworks with the learning device, instructing a generative adversarial network (GAN) to perform at least one GAN operation to thereby (i-1) select the specific driving events, among the driving events, in the specific order, (i-2) generate the specific enumerated event vector by using said each of a plurality of pieces of the information on said each of the specific driving events in the specific order and (i-3) generate the specific GT driving scenario corresponding to the specific driving events in the specific order, and (ii) the driving scenario generating device delivering the specific enumerated event vector and the specific GT driving scenario to the learning device.

As one example, the driving scenario generating device has instructed a generating network included in the GAN, which had been trained beforehand, to perform at least one generating operation, which is at least part of the GAN operation, to thereby select the specific driving events in the specific order to generate the specific enumerated event vector.

As one example, the GAN (i) had instructed the generating network to generate each of first enumerated event vectors for training corresponding to each of first groups of first driving events for training in each of first orders for training, (ii) had instructed a discriminating network to generate a predicted discrimination score representing a probability of at least one of its inputted event vector, which is at least one of the first enumerated event vectors for training and second enumerated event vectors for training generated by a manager, having been generated by the manager or the generating network, (iii) had generated a GAN loss by referring to the predicted discrimination score and a GT discrimination score, and (iv) had performed a backpropagation by using the GAN loss, to thereby learn at least part of the parameters included in the discriminating network and the generating network.

As one example, before the process of (I), the processor further performs a process of: (I3) acquiring the specific enumerated event vector and the specific GT driving scenario through a driving scenario generating device interworking with the learning device, on condition that the specific enumerated event vector and the specific GT driving scenario satisfy a prescribed verification rule.

As one example, the verification rule, corresponding to one or more specific road rules which have been violated by drivers for a prescribed number of times during a specific time range of the past, is inputted to the driving scenario generating device by a manager, and the driving scenario generating device determines that the specific enumerated event vector and the specific GT driving scenario satisfy the verification rule when one or more circumstances of complying with or violating the specific road rules are reflected on the specific enumerated event vector and the specific GT driving scenario, by referring to the verification rule.

As one example, the processor instructs the RNN to perform the RNN operation by using a technique selected among (i) a technique of long short-term memory (LSTM) and (ii) a technique of gated recurrent unit (GRU).

In accordance with still yet another aspect of the present disclosure, there is provided a testing device for detecting driving scenarios occurring during driving, to thereby evaluate driving habits of a subject driver, including: at least one memory that stores instructions; and at least one processor configured to execute the instructions to perform processes of: (I) (1) if at least one specific enumerated event vector for training, including each of pieces of information on each of specific driving events for training as its specific components for training in a specific order for training, is acquired, instructing a recurrent neural network (RNN) to apply one or more RNN operations to the specific components for training, of the specific enumerated event vector for training, in the specific order for training, to thereby detect at least one specific predicted driving scenario for training including at least part of the specific driving events for training; (2) instructing a loss module to generate an RNN loss by referring to the specific predicted driving scenario for training and a specific ground-truth (GT) driving scenario, which has been acquired beforehand, and to perform a backpropagation through time (BPTT) by using the RNN loss, to thereby learn at least part of the parameters of the RNN, if one or more driving events for testing are detected, instructing the RNN to apply the RNN operations to each of pieces of information on each of the driving events for testing, to thereby detect one or more predicted driving scenarios for testing including at least part of the driving events for testing in sequence; (II) instructing an evaluation module to generate evaluation information to be used for evaluating driving habits of the subject driver of a subject vehicle, which interworks with the testing device, by referring to the predicted driving scenario for testing.

As one example, the processor instructs an event detection module to detect the driving events for testing occurring inside and outside the subject vehicle during driving by interworking with at least one of an electrical control unit (ECU) and an exterior circumstance monitoring unit installed to the subject vehicle.

As one example, the processor instructs the event detection module to acquire at least part of interior operation information, including at least part of direction information, velocity information, turn signal information and emergency signal information by interworking with the ECU, to thereby detect at least part of the driving events for testing.

As one example, the processor instructs the event detection module to acquire at least part of exterior circumstance information, including at least part of indicating information of a traffic sign located closer than a first threshold from the subject vehicle, surrounding motion information of surrounding vehicles located closer than a second threshold from the subject vehicle and lane information in a lane including the subject vehicle by interworking with at least one of an external camera and a V2X communication module of the exterior circumstance monitoring unit, to thereby detect at least part of the specific driving events.

As one example, at the process of (II), the testing device instructs the evaluation module to perform a statistical analysis operation on at least one of the number and a frequency of the subject driver violating road rules, which are acquired by referring to the predicted driving scenario for testing, and to generate the evaluation information including a result of the statistical analysis operation.

In addition, recordable media that are readable by a computer for storing a computer program to execute the method of the present disclosure are further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
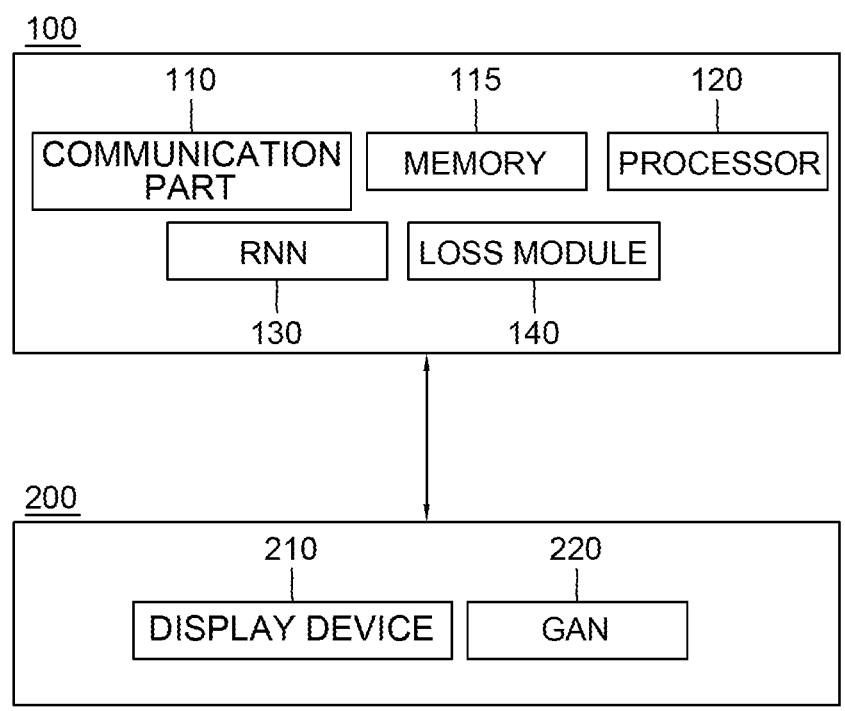
FIG. 1 is a drawing schematically illustrating a configuration of a learning device and a driving scenario generating device to be used for performing a method for providing information for evaluating driving habits of a driver by detecting driving scenarios occurring during driving in accordance with one example embodiment of the present disclosure.

Detailed explanation of the present disclosure to be made below refer to attached drawings and diagrams illustrated as specific embodiment examples under which the present disclosure may be implemented for the purposes, technical solutions, and advantages of the present disclosure. These embodiments are described in sufficient detail to enable those skilled in the art to practice the disclosure.

Besides, in the detailed description and claims of the present disclosure, the term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyways, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyways, land lots, sea, lakes, rivers, mountains, forests, deserts, sky, or any indoor space, but the scope of the present disclosure is not limited thereto.

To allow those skilled in the art to practice the present disclosure more easily, the example embodiments of the present disclosure by referring to attached diagrams will be explained in detail as shown below.

FIG. 1 is a drawing schematically illustrating a configuration of a learning device and a driving scenario generating device to be used for performing a method for providing information for evaluating driving habits of a driver by detecting driving scenarios occurring during driving in accordance with one example embodiment of the present disclosure.

By referring to FIG. 1, the learning device 100 may include at least one recurrent neural network (RNN) 130 and at least one loss module 140, to be described later. Processes of input/output and computations of the RNN 130 and the loss module 140 may be respectively performed by at least one communication part 110 and at least one processor 120. However, detailed communication schematics between the communication part 110 and the processor 120 are omitted in FIG. 1. Herein, a memory 115 may have stored various instructions to be described later, and the processor 120 may execute the instructions stored in the memory 115 and may perform processes of the present disclosure by executing the instructions to be disclosed later. Such description of the learning device 100 does not exclude an integrated device including any combination of a processor, a memory, a medium, or any other computing components.

Such learning device 100 may interwork with a driving scenario generating device 200. The driving scenario generating device 200 may include a display device 210, to be used for performing a process of selecting one or more specific driving events by a user, and include a Generative Adversarial Network 220, to be used for performing a process of selecting the specific driving events by an artificial intelligence (AI). The driving scenario generating device 200 may include at least one communication part, at least one memory and at least one processor like the learning device 100, but omitted in FIG. 1.

Herein, in FIG. 1, the driving scenario generating device 200 is illustrated to be implemented in a computing device distinct from the learning device 100, and the method of the present disclosure will be explained below based on such supposition of relationship between the driving scenario generating device 200 and the learning device 100, but those two can be implemented in a same, single computing device. That is, a person in the art will be able to draw an embodiment of implementing those two in the single computing device from explanations to be presented below. Thus it should be confirmed that such embodiment is also within the scope of the present disclosure.

Below, the learning device 100 and the driving scenario generating device 200 can be used for performing the method for providing information for evaluating driving habits of the driver by detecting the driving scenarios occurring during driving will be explained briefly, by referring to FIG. 2.

Figure 2:
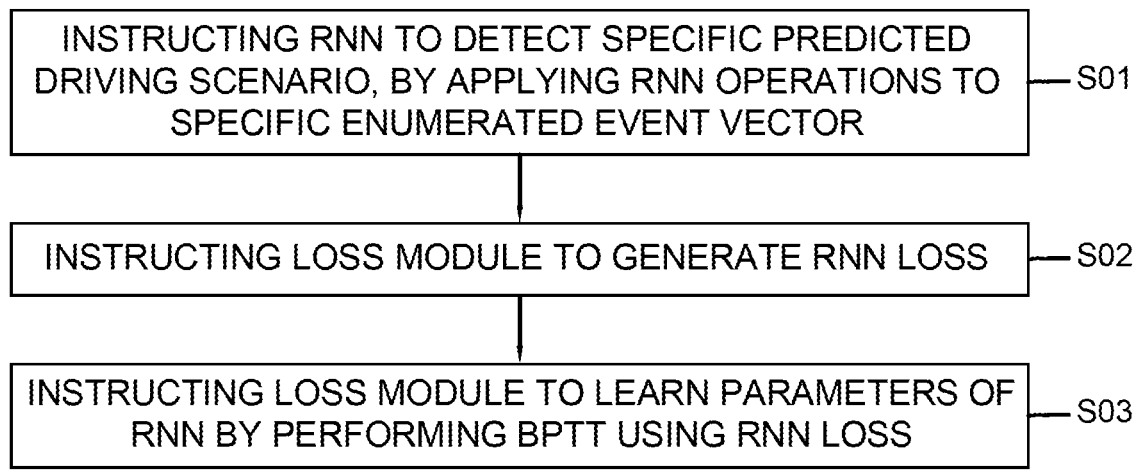
FIG. 2 is a drawing schematically illustrating a flow of the method for providing the information for evaluating driving habits of the driver by detecting the driving scenarios occurring during driving in accordance with one example embodiment of the present disclosure.

By referring to FIG. 2, at a step S01, the learning device 100, if at least one specific enumerated event vector, generated by the driving scenario generating device 200, is acquired, may instruct the RNN 130 to detect at least one specific predicted driving scenario, by applying one or more RNN operations to the specific enumerated event vector. Thereafter, the learning device 100 may instruct the loss module 140 to generate an RNN loss by referring to the specific predicted driving scenario and specific ground-truth (GT) driving scenario, at a step S02, and to learn at least part of the parameters of the RNN 130 by performing a backpropagation through time (BPTT) using the RNN loss, at a step S03. The method according to the present disclosure has been briefly explained, and it will be explained specifically below.

First, before the processes of the learning device 100 are performed, the specific enumerated driving event vector and the specific GT driving scenario should be acquired from the driving scenario generating device 200. The specific GT driving scenario may be a specific identifier corresponding to the specific driving events in a specific order, and the specific enumerated event vector may be a permutation including each of a plurality of pieces of information corresponding to each of the specific driving events in the specific order. Herein, the specific driving events can be selected among driving events by using any one of two example embodiments to be explained below.

As a first example embodiment, the driving scenario generating device 200 may have provided each of graphical objects corresponding to each of driving events including the specific driving events, through the display device 210. As the graphical objects have been provided to the user, the user may select specific graphical objects in the specific order. Thereafter, the driving scenario generating device 200 may perform a process of generating the specific enumerated event vector by using said each of a plurality of pieces of the information on said each of the selected specific driving events in the specific order, and a process of generating the specific GT driving scenario corresponding to the specific driving events in the specific order, and may deliver the specific enumerated event vector and the specific GT driving scenario to the learning device 100. Herein, in order to generate the specific enumerated event vector, the specific driving events may be put into the specific enumerated event vector, as its specific components, in the specific order. In order to explain such process of selecting the specific driving events, FIG. 3 will be referred to.

Figure 3:
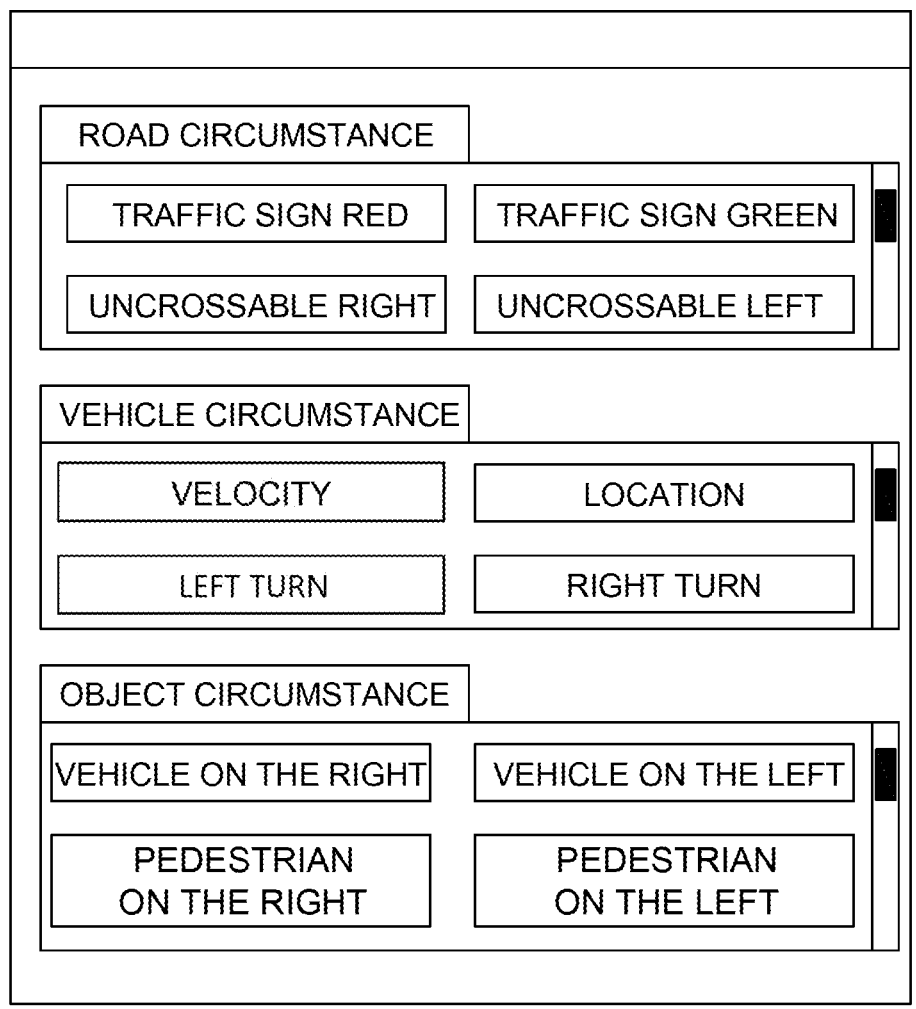
FIG. 3 is a drawing schematically illustrating how specific driving events, to be used for performing the method for providing the information for evaluating driving habits of the driver by detecting the driving scenarios occurring during the driving, can be selected by a user, in accordance with one example embodiment of the present disclosure.

FIG. 3 is a drawing schematically illustrating how specific driving events, to be used for performing the method for providing information for evaluating driving habits of the driver by detecting the driving scenarios occurring during the driving, can be selected by a user, in accordance with one example embodiment of the present disclosure.

By referring to FIG. 3, it can be seen that first graphical objects of road circumstance category, second graphical objects of vehicle circumstance category and third graphical objects of external object circumstance category are provided in the display device 210. Among graphical objects including the first, the second and the third graphical objects, specific graphical objects may be selected by the user in the specific order, and the driving scenario generating device 200 may be able to acquire information on the specific driving events, corresponding to the specific graphical objects, in the specific order.

An additional embodiment for this first example embodiment for selecting the specific driving events will be presented below. Herein, the specific enumerated event vector and the specific GT driving scenario are training data to be used for training the learning device 100, and the training data become better when more various circumstances are reflected thereon. Thus, the additional embodiment will be related to a method for modulating selected specific driving events in order to generate at least one modulated specific enumerated event vector and at least one modulated specific GT driving scenario, on which said more various circumstances are reflected.

Specifically, the driving scenario generating device 200, if the specific driving events have been selected among the driving events, may apply at least one modulation operation to at least one of the specific driving events, and further generate at least one modulated specific enumerated event vector and at least one modulated specific GT driving scenario by using the specific driving events to which the modulation operation has been applied.

For example, in case the user has selected the specific driving events corresponding to (i) a detection of a specific lane marking on the left, representing that changing lane is prohibited, (ii) lighting a left turn signal and (iii) changing its lane to the left, the driving scenario generating module 200 may modulate the specific driving events as (i) a detection of the specific lane marking on the right. (ii) lighting a right turn signal, and (iii) changing its lane to a right lane, and generate the modulated specific driving scenario and the modulated specific enumerated event vector corresponding to the modulated specific driving events. As another example, in case the user has selected the specific driving events corresponding to (i) a detection of stop line located 10 meter ahead and (ii) a measuring a velocity larger than a threshold, the driving scenario generating module 200 may generate the modulated specific driving scenario and the modulated specific enumerated event vector corresponding to the stop line located closer or farther than 10 meter.

As a second example embodiment, the specific driving events may be selected by using the AI.

That is, the driving scenario generating device 200 may instruct the GAN 220 to perform at least one GAN operation in order to select the specific driving events in the specific order, to thereby generate the specific enumerated event vector by using said each of a plurality of pieces of the information on said each of the specific driving events in the specific order and generate the specific GT driving scenario corresponding to the specific driving events in the specific order. Herein, in order to generate the specific enumerated event vector, the specific driving events may be put into the specific enumerated event vector, as its specific components, in the specific order. Thereafter, the driving scenario generating device 200 may deliver the specific enumerated event vector and the specific GT driving scenario to the learning device 100. Herein, the GAN 220 may have been trained beforehand. In order to explain a structure of the GAN 220 and its training processes, FIG. 4 will be referred to.

Figure 4:
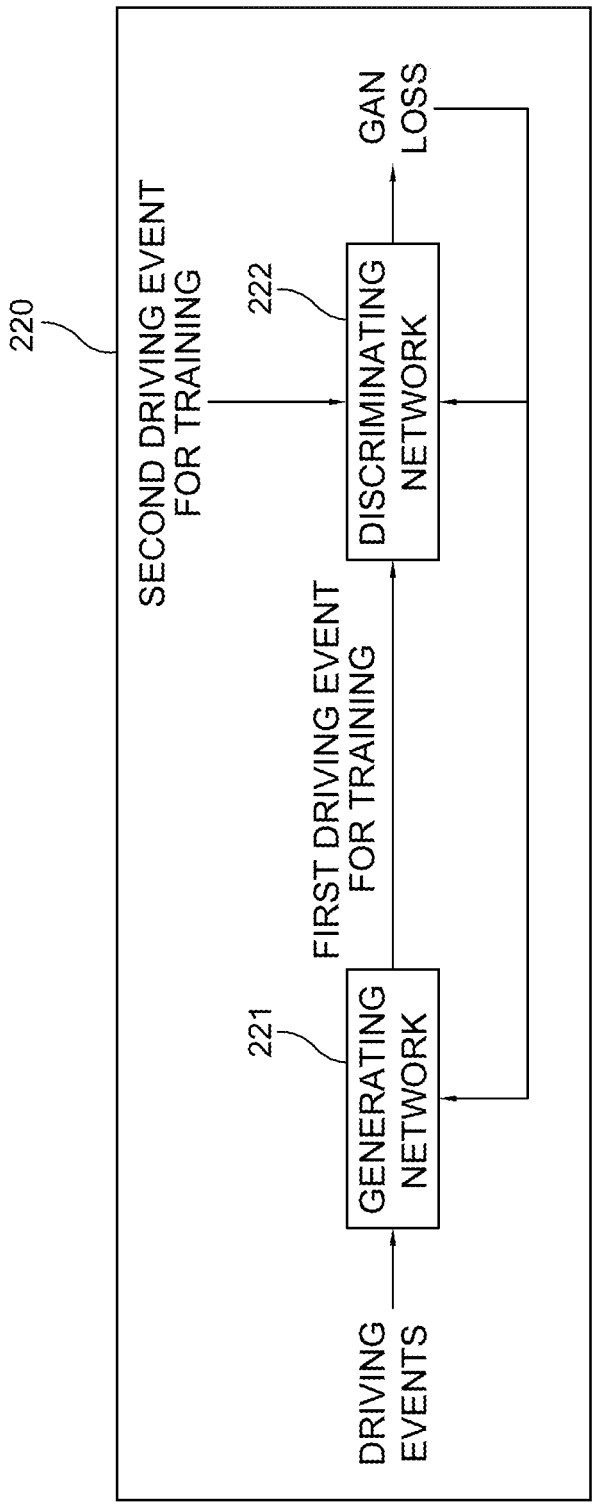
FIG. 4 is a drawing schematically illustrating how specific driving events, to be used for performing the method for providing the information for evaluating driving habits of the driver by detecting the driving scenarios occurring during the driving, can be selected by using a generative adversarial network (GAN), in accordance with one example embodiment of the present disclosure.

FIG. 4 is a drawing schematically illustrating how specific driving events, to be used for performing the method for providing the information for evaluating driving habits of the driver by detecting the driving scenarios occurring during the driving, can be selected by using a generative adversarial network (GAN), in accordance with one example embodiment of the present disclosure.

By referring to FIG. 4, the GAN 220 may include a generating network 221 and a discriminating network 222. Herein, the GAN 220 may have instructed the generating network 221 to generate each of a plurality of first enumerated event vectors for training corresponding to each of first groups of first driving events for training in each of first orders for training. Thereafter, the GAN 220 may have instructed the discriminating network 222 to generate a predicted discrimination score representing a probability of at least one its inputted enumerated event vector, which is at least one of the first enumerated event vectors for training and second enumerated event vectors for training generated by a manager, having been generated by the manager or the generating network. The GAN 220 may have generated a GAN loss by referring to the predicted discrimination score and a GT discrimination score, and perform a backpropagation by using the GAN loss, to thereby learn at least part of the parameters included in the discriminating network 222 and the generating network 221.

That is, the discriminating network 222 may be trained to more accurately determine whether its inputted enumerated event vector is generated by a human or the AI, and the generating network 221 may be trained to more successfully deceive the discriminating network 222. As a result, the generating network 221 may be able to generate enumerated event vectors, including the specific enumerated event vectors, more similar to the human.

After the generating network 221 is trained, it may be able to select the specific driving events in the specific order, to thereby generate the specific enumerated event vector.

Herein, both of the first example embodiment and the second example embodiment can be implemented through the driving scenario generating device 200 at the same time, and may be selected by the user through a GUI.

Further, the scenario generating device 200 may deliver the specific enumerated event vector and the specific GT driving scenario to the learning device 100, on the condition that those satisfy a prescribed verification rule. Below, the verification rule will be explained.

The verification rule may correspond to one or more specific road rules which have been violated by drivers for a prescribed number of times during a specific time range of the past, for example, during a recent year. Such verification rule may be inputted to the driving scenario generating device 200 by the manager, and the driving scenario generating device 200 may determine whether one or more circumstances of complying with or violating the specific road rules are reflected on the specific enumerated event vector and the specific GT driving scenario or not, by referring to the verification rule, and may determine that those satisfy the verification rule only if such circumstances are reflected thereon.

For example, suppose that the specific road rules, violated by drivers during a past recent year, are two rules including (i) a rule that lanes should not be changed in a tunnel and (ii) a rule that a U-turn is only allowed at a timing provided by a road sign. Herein, if the specific enumerated event vector and the specific GT driving scenario are not related to the specific road rules of (i) and (ii), those may be determined as not satisfying the verification rule. Whether those are related to the specific road rules or not may be determined by finding out whether the specific driving events include verification driving events corresponding to the specific road rules or not.

After the specific enumerated event vector and the specific GT driving scenario are acquired, the learning device 100 may instruct the RNN 130 to apply one or more RNN operations to the specific components of the specific enumerated event vector in the specific order.

Herein, the RNN 130 may be trained to perform the RNN operation by using a technique selected among (i) a technique of long short-term memory (LSTM) and (ii) a technique of gated recurrent unit (GRU). For the LSTM technique, an RNN cell including an input gate, a forget gate and an output gate may be used for generating a short-term state vector and a long-term state vector. For the GRU technique, an RNN cell including an update gate and a reset gate may be used for generating a state vector. Such LSTM technique and the GRU technique, to be used for establishing the RNN 130 of the present disclosure, are well-known prior arts thus more specific explanation may be omitted.

Thereafter, the learning device 100 may instruct the loss module 140 to generate the RNN loss by referring to the specific predicted driving scenario and the specific GT driving scenario. In order to generate the RNN loss, a cross-entropy algorithm, which is a well-known prior art, can be used. More specifically, the specific predicted driving scenario may be a vector including probabilities of driving scenarios being included in the specific enumerated event vector as its components. The specific GT driving scenario may be a one-hot encoding vector, including zeros, representing that their corresponding driving scenarios are not present in the specific enumerated event vector, as its components and representing that its corresponding driving scenario is present in the specific enumerated event vector. By using the specific predicted driving scenario in a form of the vector and the specific GT driving scenario in a form of the one-hot encoding vector, the cross-entropy algorithm can be performed to generate the RNN loss. More specific explanation on the cross-entropy algorithm is omitted, since it is well-known prior art.

After the RNN loss is generated, the learning device 100 may instruct the loss module 140 to learn at least part of the parameters of the RNN 130 by performing the BPTT, using the RNN loss.

By performing the processes explained above, the RNN 130 may be trained. Below, a testing method of the present disclosure will be explained. A testing device performing the testing method may include an evaluation module and an event detection module, other than the loss module 140.

Specifically, on condition that (1) the learning device 100, in response to at least one specific enumerated event vector for training, including each of pieces of information on each of specific driving events for training as its specific components for training in a specific order for training, being acquired, has instructed the RNN 130 to apply the RNN operations to the specific components for training, of the specific enumerated event vector for training, in the specific order for training, to thereby detect at least one specific predicted driving scenario for training including at least part of the specific driving events for training; and (2) the learning device 100 has instructed the loss module 140 to generate the RNN loss by referring to the specific predicted driving scenario for training and the specific ground-truth (GT) driving scenario, which has been acquired beforehand, and to perform a backpropagation through time (BPTT) by using the RNN loss, to thereby learn at least part of the parameters of the RNN 130. A testing device, which interworks with a subject vehicle, if one or more driving events for testing are detected, may instruct the RNN 130 to apply the RNN operation to each of pieces of information on each of the driving events for testing, to thereby detect one or more predicted driving scenarios for testing including at least part of the driving events for testing in sequence.

Thereafter, the testing device may instruct the evaluation module to generate evaluation information to be used for evaluating driving habits of a subject driver of the subject vehicle, by referring to the predicted driving scenario for testing.

Herein, the driving events for testing, occurring inside and outside of the subject vehicle during a driving, may be detected by the event detection module. That is, the testing device may instruct the event detection module to detect the driving events for testing by interworking with at least one of an electrical control unit (ECU) and an exterior circumstance monitoring unit installed on the subject vehicle.

Specifically, the testing device may instruct the event detection module to acquire at least part of interior operation information, including at least part of direction information, velocity information, turn signal information and emergency signal information by interworking with the ECU, to thereby detect at least part of the driving events for testing. The ECU controls the subject vehicle, and the internal operation information may be acquired by interworking with the ECU. Specific acquiring processes are well-known prior arts and are hereby omitted.

Also, the testing device may instruct the event detection module to acquire at least part of exterior circumstance information, including at least part of indicating information of a traffic sign located closer than a first threshold from the subject vehicle, surrounding motion information of surrounding vehicles located closer than a second threshold from the subject vehicle, and lane information in a lane including the subject vehicle, by interworking with the exterior circumstance monitoring unit. Herein, the exterior circumstance monitoring unit may include an external camera and a V2X communication module. As an example, the indicating information and the lane information may be acquired by applying image processing operations to driving images acquired through the external camera. As another example, the indication information, the surrounding motion information and the lane information may be acquired by using the V2X communication module, which communicates with a server or the surrounding vehicles.

After the driving events for testing are acquired, the testing device may instruct the RNN 130, which has been fully trained, to detect the predicted driving scenarios for testing, by sequentially applying the RNN operations to each of pieces of information on each of the driving events for testing. For example, if the driving events for testing, corresponding to (i) the detection of the specific lane marking on the right, (ii) the lighting the right turn signal, and (iii) the changing its lane to the left lane are detected, the RNN 130 may detect the predicted driving scenario for testing corresponding to a violation of a lane changing rule.

Thereafter, the testing device may instruct the evaluation module to perform a statistical analysis operation on at least one of the number and a frequency of the subject driver violating road rules, which are acquired by referring to the predicted driving scenario for testing, and to generate the evaluation information including a result of the statistical analysis operation. For example, the evaluation information may include statistically analyzed information on how often the subject driver violates the road rules and how far the subject driver in average drives the subject vehicle without violating the road rules.

The present disclosure has an effect of providing a method for detecting the driving scenarios during driving.

The present disclosure has another effect of providing a method for evaluating driving habits of the driver by using the detected driving scenarios.

The present disclosure has still another effect of providing a method for evaluating driving habits, to thereby support the driver to analyze driving habits and improve driving habits.

The embodiments of the present disclosure as explained above can be implemented in a form of executable program command through a variety of computer means recordable to computer readable media. The computer readable media may includes solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help with more general understanding of the present disclosure. It, however, will be understood by those skilled in the art that various changes and modifications may be made from the description without departing from the spirit and scope of the disclosure as defined in the following claims.

Accordingly, the spirit of the present disclosure must not be confined to the explained embodiments, and the following patent claims as well as everything including variations equal or equivalent to the patent claims pertain to the category of the spirit of the present disclosure.

What is claimed is:

1. A computer-implemented learning method for detecting driving events occurring during driving, thereby to detect driving scenarios including at least part of the driving events, comprising steps of:
 providing a plurality of graphical objects corresponding to a plurality of driving events through a display, each of the graphical objects corresponding to each of the driving events respectively, each of the graphical objects being individually selectable by a user;
 in response to the graphical objects corresponding to the driving events being selected by the user in a specific order, generating an event vector by using pieces of information on each of the selected driving events, the event vector enumerating the selected driving events in the specific order and including the pieces of the information as its components;
 generating a ground-truth (GT) driving scenario corresponding to the driving events in the specific order;

delivering the event vector and the GT driving scenario to recurrent neural network (RNN) as training data responsive to the event vector and the GT driving scenario satisfying a prescribed verification rule, wherein the verification rule corresponds to one or more road rules which have been violated by drivers for a prescribed number of times during a time range of the past, and wherein the event vector and the GT driving scenario satisfy the verification rule when one or more circumstances of complying with or violating the road rules are reflected in the event vector and the GT driving scenario;

in response to the RNN acquiring the event vector, applying, by the RNN, one or more RNN operations to the components of the event vector, in the specific order, thereby to detect at least one predicted driving scenario including at least part of the driving events; and generating an RNN loss by referring to the predicted driving scenario and the GT driving scenario and to perform a backpropagation through time (BPTT) by using the RNN loss, thereby to learn at least part of a plurality of parameters of the RNN.

2. The learning method of claim 1, wherein, in response to the driving events being selected, at least one modulation operation is applied to at least one of the driving events, and at least one modulated event vector and at least one modulated GT driving scenario are generated by using the driving events to which the modulation operation has been applied.

3. The method of claim 1, further comprising instructing the RNN to perform the RNN operation by using a long short-term memory (LSTM) or a gated recurrent unit (GRU).

4. A computer-implemented learning method for detecting driving events occurring during driving, thereby to detect driving scenarios including at least part of the driving events, comprising steps of:
instructing a generating network included in a generative adversarial network (GAN) to:
select a plurality of driving events in a specific order, generate an event vector by using pieces of information on each of the driving events, the event vector enumerating the selected driving events in the specific order and including the pieces of the information as its components; and
generate a ground-truth (GT) driving scenario corresponding to the driving events in the specific order;
delivering the event vector and the GT driving scenario to a recurrent neural network (RNN) as training data responsive to the event vector and the GT driving scenario satisfying a prescribed verification rule, wherein the verification rule corresponds to one or more road rules which have been violated by drivers for a prescribed number of times during a time range of the past, and wherein the event vector and the GT driving scenario satisfy the verification rule when one or more circumstances of complying with or violating the road rules are reflected in the event vector and the GT driving scenario;
upon the RNN acquiring the event vector, applying, by the RNN, one or more RNN operations to the components of the event vector, in the specific order, thereby to detect at least one predicted driving scenario including at least part of the driving events; and
generating, by the RNN, an RNN loss by referring to the specific predicted driving scenario and the GT driving scenario and to perform a backpropagation through time (BPTT) by using the RNN loss, thereby to learn at least part of a plurality of parameters of the RNN.

5. The learning method of claim 4, further comprising the GAN learning at least part of a plurality of parameters included in a discriminating network and the generating network by:
instructing the generating network to generate a plurality of first event vectors for training corresponding to each of a plurality of first groups of first driving events for training in each of a plurality of first orders for training,
instructing the discriminating network to generate a predicted discrimination score representing a probability that at least one inputted event vector was generated by a manager or the generating network,
generating a GAN loss by referring to the predicted discrimination score and a GT discrimination score, and
performing a backpropagation by using the GAN loss.

6. A testing method for detecting driving scenarios occurring during driving, thereby to evaluate driving habits of a subject driver, comprising steps of:
learning a part of a plurality of parameters of a recurrent neural network (RNN) by:
acquiring at least one event vector and a ground-truth (GT) driving scenario for training,
wherein the event vector includes as its components a plurality of pieces of information on each of a plurality of driving events in a specific order,
wherein the event vector and the GT driving scenario are acquired by the RNN responsive to the event vector and the GT driving scenario satisfying a prescribed verification rule,
wherein the verification rule corresponds to one or more road rules that have been violated by drivers for a prescribed number of times during a time range of the past, and
wherein the event vector and the GT driving scenario satisfy the verification rule when one or more circumstances of complying with or violating the road rules are reflected in the event vector and the GT driving scenario;
in response to the acquisition of the at least one event vector for training, instructing the RNN to apply one or more RNN operations to the components of the event vector in the specific order, thereby to detect at least one predicted driving scenario for training including at least part of the driving events for training;
generating an RNN loss by referring to the predicted driving scenario and the GT driving scenario and performing a backpropagation through time (BPTT) by using the RNN loss;
detecting a plurality of driving events for testing,
wherein the driving events for testing comprise interior operation information and exterior circumstance information, the interior operation information including direction information, velocity information, turn signal information, and emergency signal information, and the exterior circumstance information including information about a traffic sign located closer than a first threshold from a subject vehicle, surrounding motion information of surrounding vehicles located closer than a second threshold from the subject vehicle, and lane information about a lane that includes the subject vehicle, and
wherein the driving events for testing are captured by at least one of an electrical control unit (ECU) and an external circumstance monitor, the external circumstance monitor comprising an external camera and a V2X communicator;

in response to one or more of the driving events for testing being detected, instructing the RNN to apply the RNN operations to each of the driving events for testing in sequence, thereby to detect one or more predicted driving scenarios for testing including at least part of the driving events for testing; and generating evaluation information to be used for evaluating the driving habits of the subject driver of the subject vehicle, by referring to at least one of the predicted driving scenarios for testing.

7. The method of claim 6, further comprising performing a statistical analysis operation on at least one of a number and a frequency of the subject driver violating road rules, which are acquired by referring to the predicted driving scenarios for testing, and generating the evaluation information including a result of the statistical analysis operation.

8. A learning device for detecting driving events occurring during driving, thereby to detect driving scenarios including at least part of the driving events, comprising:

at least one memory that stores instructions; and at least one processor configured to execute the instructions to perform processes of:

acquiring an event vector and a ground-truth (GT) driving scenario by performing processes of:

providing a plurality of graphical objects corresponding to a plurality of driving events through a display, each of the graphical objects corresponding to each of the driving events respectively, each of the graphical objects being individually selectable by a user;

in response to the plurality of the graphical objects corresponding to the driving events being selected by the user in a specific order, generating the event vector by using pieces of information on said each of the selected driving events, the event vector enumerating the selected driving events in the specific order and including the pieces of the information as its components;

generating the GT driving scenario corresponding to the driving events in the specific order;

delivering the event vector and the GT driving scenario to a recurrent neural network (RNN) as training data responsive to the event vector and the GT driving scenario satisfying a prescribed verification rule, wherein the verification rule corresponds to one or more road rules which have been violated by drivers for a prescribed number of times during a time range of the past, and wherein the event vector and the GT driving scenario satisfy the verification rule when one or more circumstances of complying with or violating the road rules are reflected in the event vector and the GT driving scenario;

upon acquiring the event vector, instructing the RNN to apply one or more RNN operations to the components of the event vector, in the specific order, thereby to detect at least one predicted driving scenario including at least part of the driving events; and generating an RNN loss by referring to the predicted driving scenario and the GT driving scenario and performing a backpropagation through time (BPTT) by using the RNN loss, thereby to learn at least part of a plurality of parameters of the RNN.

9. The learning device of claim 8, wherein, in response to the driving events being selected, at least one modulation operation is applied to at least one of the driving events, and at least one modulated event vector and at least one modulated GT driving scenario are generated by using the driving events to which the modulation operation has been applied.

10. The device of claim 8, wherein the processor instructs the RNN to perform the RNN operation by using a long short-term memory (LSTM) or a gated recurrent unit (GRU).

11. A learning device for detecting driving events occurring during driving, thereby to detect driving scenarios including at least part of the driving events, comprising:

at least one memory that stores instructions; and at least one processor configured to execute the instructions to perform processes of:

instructing a generating network included in a generative adversarial network (GAN) to:

select a plurality of driving events in a specific order, generate an event vector by using pieces of information on each of the driving events, the event vector enumerating the selected driving events in the specific order and including the pieces of the information as its components; and generate a ground-truth (GT) driving scenario corresponding to the driving events in the specific order, delivering the event vector and the GT driving scenario to a recurrent neural network (RNN) as training data responsive to the event vector and the GT driving scenario satisfying a prescribed verification rule, wherein the verification rule corresponds to one or more road rules which have been violated by drivers for a prescribed number of times during a time range of the past, and wherein the event vector and the GT driving scenario satisfy the verification rule when one or more circumstances of complying with or violating the road rules are reflected in the event vector and the GT driving scenario;

upon acquiring the event vector, instructing the RNN to apply one or more RNN operations to the components of the event vector, in the specific order, thereby to detect at least one predicted driving scenario including at least part of the driving events; and generating an RNN loss by referring to the predicted driving scenario and the GT driving scenario and performing a backpropagation through time (BPTT) by using the RNN loss, thereby to learn at least part of a plurality of parameters of the RNN.

12. The learning device of claim 11, wherein the instructions in the memory, when executed by the processor, further cause the GAN to learn at least part of a plurality of parameters included in a discriminating network and the generating network by:

instructing the generating network to generate each of a plurality of first event vectors for training corresponding to each of a plurality of first groups of first driving events in each of a plurality of first orders, instructing the discriminating network to generate a predicted discrimination score representing a probability that at least one inputted event vector was generated by a manager or the generating network, generating a GAN loss by referring to the predicted discrimination score and a GT discrimination score, and performing a backpropagation by using the GAN loss.

13. A testing device for detecting driving scenarios occurring during driving, thereby to evaluate driving habits of a subject driver, comprising:
  at least one memory that stores instructions; and
  at least one processor configured to execute the instructions to perform processes of:
    learning a part of a plurality of parameters of a recurrent neural network (RNN) by:
      acquiring at least one event vector and a ground-truth (GT) driving scenario for training,
        wherein the event vector includes as its components a plurality of pieces of information on each of a plurality of driving events in a specific order,
        wherein the event vector and the GT driving scenario are acquired by the RNN responsive to the event vector and the GT driving scenario satisfying a prescribed verification rule,
        wherein the verification rule corresponds to one or more road rules that have been violated by drivers for a prescribed number of times during a time range of the past, and
        wherein the event vector and the GT driving scenario satisfy the verification rule when one or more circumstances of complying with or violating the road rules are reflected in the event vector and the GT driving scenario;
      in response to the acquisition of the at least one event vector for training, instructing a recurrent neural network (RNN) to apply one or more RNN operations to the components for training, of the event vector, in the specific order, thereby to detect at least one predicted driving scenario for training including at least part of the driving events for training;
      generating an RNN loss by referring to the predicted driving scenario for training and the GT driving scenario, and performing a backpropagation through time (BPTT) by using the RNN loss;
    detecting a plurality of driving events for testing,
      wherein the driving events for testing comprise interior operation information and exterior circumstance information, the interior operation information including direction information, velocity information, turn signal information, and emergency signal information, and the exterior circumstance information including information about a traffic sign located closer than a first threshold from a subject vehicle, surrounding motion information of surrounding vehicles located closer than a second threshold from the subject vehicle, and lane information about a lane that includes the subject vehicle, and
      wherein the driving events for testing are captured by at least one of an electrical control unit (ECU) and an external circumstance monitor, the external circumstance monitor comprising an external camera and a V2X communicator;
    in response to one or more of the driving events for testing being detected, instructing the RNN to apply the RNN operations to each of the driving events for testing in sequence, thereby to detect one or more predicted driving scenarios for testing including at least part of the driving events for testing; and
    generating evaluation information to be used for evaluating the driving habits of the subject driver of a subject vehicle, by referring to at least one of the predicted driving scenarios for testing.

14. The device of claim 13, wherein the instructions in the memory, when executed by the processor, further cause the device to perform a statistical analysis operation on at least one of a number and a frequency of the subject driver violating road rules, which are acquired by referring to the predicted driving scenarios for testing, and to generate the evaluation information including a result of the statistical analysis operation.

* * * * *